United States Patent [19]

Minematsu et al.

[11] Patent Number: 5,430,101
[45] Date of Patent: Jul. 4, 1995

[54] DELUSTERED RUBBER MODIFIED STYRENIC BLENDS

[75] Inventors: Hiroyuki Minematsu; Tetuya Yamamoto, both of Niihama, Japan

[73] Assignee: Sumitomo Dow Limited, Osaka, Japan

[21] Appl. No.: 141,950

[22] Filed: Oct. 28, 1993

Related U.S. Application Data

[60] Division of Ser. No. 519,317, May 8, 1990, which is a continuation of Ser. No. 257,576, Oct. 14, 1988, abandoned.

[30] Foreign Application Priority Data

Oct. 14, 1987 [JP] Japan .................. 62-260124

[51] Int. Cl.[6] .............. C08L 55/02; C08L 51/04; C08L 37/00; C08L 25/08
[52] U.S. Cl. .................... 525/73; 525/67; 525/74; 525/78; 525/79
[58] Field of Search ............... 525/73, 74, 78, 79

[56] References Cited

U.S. PATENT DOCUMENTS

| | | | |
|---|---|---|---|
| 3,322,853 | 5/1967 | Trementozzi et al. | 525/65 |
| 4,429,076 | 1/1984 | Saito et al. | 525/57 |
| 4,444,950 | 4/1984 | Sakano et al. | 525/67 |
| 4,554,316 | 11/1985 | Sakano et al. | 525/71 |
| 4,596,851 | 6/1986 | Lindner et al. | 525/67 |
| 4,657,975 | 4/1987 | Kodama et al. | 525/74 |
| 4,728,461 | 3/1988 | Fujii et al. | 525/68 X |
| 4,835,215 | 5/1989 | Sakano et al. | 525/71 |
| 4,870,131 | 9/1989 | Pisipati et al. | 525/74 |
| 4,900,787 | 2/1990 | Sakano et al. | 525/71 |

FOREIGN PATENT DOCUMENTS

| | | |
|---|---|---|
| 89042 | 9/1983 | European Pat. Off. . |
| 180819 | 5/1986 | European Pat. Off. . |
| 202214 | 11/1986 | European Pat. Off. . |
| 216207 | 1/1987 | European Pat. Off. . |
| 354034 | 2/1990 | European Pat. Off. . |
| 1452637 | 9/1966 | France . |
| 2536080 | 5/1984 | France . |
| 58-040350 | 3/1983 | Japan . |
| 62-008444 | 4/1987 | Japan . |

*Primary Examiner*—David Buttner

[57] ABSTRACT

A thermoplastic resin composition comprising:

(A) 40 to 99.8 parts by weight of a rubber-modified styrene base thermoplastic resin, (B) 0.1 to 20 parts by weight of a copolymer having an epoxy group but comprising no olefin, and (C) 0.1 to 50 parts by weight of a polymer having at least one functional group selected from the group consisting of a carboxyl group, an acid anhydride group, a hydroxyl group and a nitrogen-containing base group with the total amount of the rubber-modified styrene base thermoplastic resin (A), the copolymer (B) and the polymer (C) being 100 parts by weight and the content of the rubber in the composition being from 5 to 40 % by weight based on the weight of the composition, which has good flowability and imparts a uniformly delustered surface and good impact resistance to a molded article.

18 Claims, No Drawings

DELUSTERED RUBBER MODIFIED STYRENIC BLENDS

This is a divisional of application Ser. No. 07/519,317 filed on May 8, 1990, which is a continuation of Ser. No. 07/257,576, filed on Oct. 14, 1988, now abandoned.

BACKGROUND OF THE INVENTION

1. Field of the Invention

The present invention relates to a thermoplastic resin composition which has good flowability and can impart a uniformly delustered surface and improved properties such as impact resistance to a molded article.

2. Description of the Related Art

A rubber-modified styrene base thermoplastic resin a typical example of which is an ABS resin (acrylonitrilediene rubber-styrene copolymer) has good mechanical properties such as impact resistance, stiffness, etc. and good appearance of the molded article. Therefore, the rubber-modified styrene base thermoplastic resin is used as a material of, for example, automobile parts, business machine parts and haberdasheries. In view of safety and matching with other parts or of achieving a mat type calm hand, low gloss delustered resin articles are desired for the automobile parts, particularly, the automobile interior parts.

To impart a delustered surface to a resin article, following measures have been proposed:

i) addition of an inorganic filler such as calcium carbonate,
ii) addition of a rubbery polymer,
iii) incorporation of an ethylenically unsaturated carboxylic acid in the styrene base thermoplastic resin by copolymerization, and
iv) addition of a copolymer of an olefin having an epoxy group.

However, the addition of the inorganic filler considerably deteriorates the impact resistance which is one of the characteristics of the rubber-modified thermoplastic resin. The addition of the rubbery polymer generates defects such as flow marks on the surface of the molded article so that no uniformly delustered surface is obtained. The incorporation of the ethylenically unsaturated carboxylic acid gives uneven gloss on the surface of the molded article. In comparison with the above three measures, the addition of the polymer of the olefin having an epoxy group has good delustering effects and forms a uniformly delustered surface without defects. However, as the amount of the polymer added to the rubber-modified styrene base thermoplastic resin increases, the flowability and impact resistance, particularly notched impact resistance are decreased.

SUMMARY OF THE INVENTION

One object of the present invention is to provide a thermoplastic resin composition which forms a uniformly delustered surface on a molded article.

Another object of the present invention is to provide a thermoplastic resin composition which has good flowability and affords a delustered molded article having improved non-deteriorated impact strength.

Accordingly, the present invention provides a thermoplastic resin composition comprising:

(A) 40 to 99.8 parts by weight of a rubber-modified styrene base thermoplastic resin,
(B) 0.1 to 20 parts by weight of a copolymer having an epoxy group but comprising no olefin, and
(C) 0.1 to 50 parts by weight of a polymer having at least one functional group selected from the group consisting of a carboxyl group, an acid anhydride group, a hydroxyl group and a nitrogen-containing base group with the total amount of the rubber-modified styrene base thermoplastic resin (A), the copolymer (B) and the polymer (C) being 100 parts by weight and the content of the rubber in the composition being from 5 to 40% by weight based on the weight of the composition.

DETAILED DESCRIPTION OF THE INVENTION

The thermoplastic resin composition of the present invention will be illustrated in detail.

Rubber-modified styrene base thermoplastic resin (A)

The rubber-modified styrene base thermoplastic resin (A) is a graft copolymer which is obtainable by polymerizing at least one aromatic vinyl compound and optionally at least one ethylenically unsaturated compound copolymerizable therewith in the presence of a rubber, or a mixture of such graft polymer and a copolymer comprising at least one aromatic vinyl compound and at least one ethylenically unsaturated compound copolymerizable therewith.

Examples of the rubber are (i) butadiene base rubbers (e.g. polybutadiene, butadiene-styrene copolymer, butadiene-acrylonitrile copolymer and the like), (ii) ethylene-$\alpha$-olefin base rubbers (e.g. a copolymer of ethylene with propylene or butene (EPR), a copolymer of ethylene with propylene or butene and a non-conjugated diene (EPDM) and the like), (iii) alkyl acrylate base rubbers which are obtainable by polymerizing or copolymerizing at least one monomer selected from the group consisting of $C_1$-$C_{16}$-alkyl acrylate (e.g. methyl acrylate, ethyl acrylate, butyl acrylate, 2-ethylhexyl acrylate, etc.) and optionally at least one of other copolymerizable monomers in the presence or absence of a cross linking agent, (iv) ethylene-vinyl acetate copolymers and (v) chlorinated polyethylene. These may be used independently or as a mixture.

Specific examples of the aromatic vinyl compound are styrene, $\alpha$-methylstyrene, o-methylstyrene, m-methylstyrene, p-methylstyrene, tert.-butylstyrene, $\alpha$-methylvinyltoluene, dimethylstyrene, chlorostyrene, dichlorostyrene, bromostyrene, dibromostyrene, vinylnaphthalene, and mixtures thereof.

Specific examples of the ethylenically unsaturated compound copolymerizable with the aromatic vinyl compound are cyanated vinyl compounds such as acrylonitrile, methacrylonitrile, ethacrylonitrile and fumaronitrile; alkyl unsaturated carboxylates such as methyl acrylate, ethyl acrylate, butyl acrylate, 2-ethylhexyl acrylate, methyl methacrylate, ethyl methacrylate, propyl methacrylate and 2-ethylhexyl methacrylate; maleimide compounds such as maleimide, N-methyl maleimide, N-phenyl maleimide and N-cyclohexyl maleimide; and unsaturated amide compounds such as acrylamide and methacrylamide; and mixtures thereof.

Preferred examples of the rubber-modified styrene base thermoplastic resin (A) are butadiene base rubber-modified acrylonitrile-styrene copolymer (ABS), butadiene base rubber-modified styrene polymer (HIPS), butadiene base rubber-modified methyl methacrylate-styrene copolymer (MBS), butadiene base rubber-modified acrylonitrile-methyl methacrylate-styrene copolymer (ABSM), butadiene base rubber-modified acrylonitrile-α-methylstyrene-styrene copolymer, butadiene base rubber-modified acrylonitrile-α-methyl-styrene-methyl methacrylate-styrene copolymer, butadiene base rubber-modified styrene-N-phenylmaleimide copolymer, butadiene base rubber-modified acrylonitrile-styrene-N-phenylmaleimide copolymer, butadiene base rubber-modified styrene-methyl methacrylate-N-phenylmaleimide copolymer and the like. Further, rubber-modified styrene base thermoplastic resins corresponding to the above exemplified rubber-modified styrene base resins in which the butadiene base rubber is replaced with (i) ethylene-α-olefin base rubber, (ii) alkyl acrylate rubber, (iii) ethylene-vinyl acetate copolymer or (iv) chlorinated polyethylene may be used. These modified resins are used independently or as a mixture thereof.

The rubber-modified styrene base thermoplastic resin (A) may be prepared by any of conventional methods such as emulsion polymerization, suspension polymerization, bulk polymerization, solution polymerization and combinations thereof.

Copolymer having an epoxy group but comprising no olefin (B)

The copolymer having an epoxy group but comprising no olefin (B) is a copolymer comprising at least one unsaturated epoxy compound and at least one ethylenically unsaturated compound except olefins. There is no specific limitation on the composition of the epoxy group containing copolymer (B). Preferably, the copolymer (B) comprises 0.05 to 50% by weight, particularly 0.1 to 30% by weight of the unsaturated epoxy compound.

The unsaturated epoxide monomer is a monomer having at least one unsaturated bond which can contribute to copolymerization with the ethylenically unsaturated compound and at least one epoxy group in one molecule. Examples of such epoxide monomer are an unsaturated glycidyl ester of the formula:

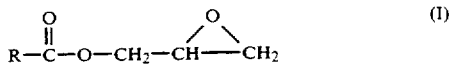

wherein R is a hydrocarbon group having a polymerizable ethylenically unsaturated bond, an unsaturated glycidyl ether of the formula:

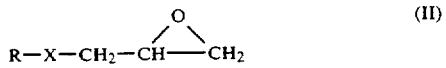

wherein R is the same as defined in the formula (I), and X is a divalent group of the formula: —CH$_2$—O—,

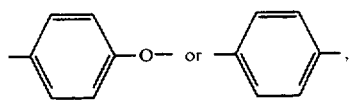

and an epoxyalkene of the formula:

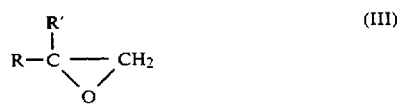

wherein R is the same as defined in the formula (I), and R' is hydrogen or methyl. Specific examples of these epoxide monomers are glycidyl acrylate, glycidyl methacrylate, glycidyl esters of iraconic acid, glycidyl esters of butenecarboxylic acid, allylglycidyl ether, 2-methylallylglycidyl ether, styrene-p-glycidyl ether, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide, and the like. Among them, glycidyl acrylate and glycidyl methacrylate are preferred.

Examples of the ethylenically unsaturated compound include those exemplified in the above description in connection with the rubber-modified styrene base thermoplastic resin (A) such as the aromatic vinyl compounds, the cyanated vinyl compounds, the alkyl easters of the unsaturated carboxylic acids, the maleimide compounds and the unsaturated amide compounds, and also unsaturated acid anhydrides such as maleic anhydride. They can be used independently or as a mixture thereof. Among the copolymer (B), one comprising the aromatic vinyl compound is preferred.

In the copolymerization to prepare the copolymer (B), the ethylenically unsaturated compound is copolymerized in an amount of 50 to 99.5% by weight, preferably 70 to 99.9% by weight based on the whole weight of the compounds to be copolymerized.

The copolymer having an epoxy group but comprising no olefin (B) can be prepared by copolymerizing the unsaturated epoxy compound and the ethylenically unsaturated compound. Alternatively, the copolymer (B) can be prepared by graft copolymerizing the unsaturated epoxy compound and/or the ethylenically unsaturated compound in the presence of a copolymerizable polymer.

Preferred examples of the copolymer (B) are styrene-glycidyl methacrylate copolymer, styrene-acrylonitrile-glycidyl methacrylate copolymer, styrene-acrylo-nitrile-methyl methacrylate-glycidyl methacrylate copolymer, and a graft copolymer prepared by polymerizing glycidyl methacrylate or a monomeric mixture constituting the above described copolymer in the presence of the rubber.

The copolymer (B) may be prepared by any of conventional methods such as emulsion, suspension, solution, bulk, polymerization and combinations thereof.

Polymer having the functional group (C)

The polymer having the functional group (C) is a polymer comprising an ethylenically unsaturated compound having at least one functional group selected from the group consisting of a carboxyl group, an acid anhydride group, a hydroxyl group and a nitrogen-containing base group, or a copolymer comprising said ethylenically unsaturated compound and other unsaturated compound.

Examples of the ethylenically unsaturated compound having the carboxyl group are acrylic acid, methacrylic acid, maleic acid, fumaric acid, itaconic acid and mixture thereof. Examples of the ethylenically unsaturated compound having the acid anhydride group are maleic anhydride, iraconic anhydride, citraconic anhydride and mixtures thereof. Examples of the ethylenically unsaturated compound having the hydroxyl group are hydroxyethyl (meth)acrylate, hydroxypropyl (meth)acrylate and mixtures thereof. Examples of the ethylenically unsaturated compound having the nitrogen-containing base group are dimethylaminoethyl (meth)acrylate, diethylaminoethyl (meth)acrylate, 2-vinylpyridine, 3-vinyl-pyridine, 4-vinylpyridine, 2-methyl-5-vinylpyridine, N-vinylimidazole, N-vinylindole, N-vinylcarbazole, N-vinylpyrrole, p-aminostyrene, p-dimethylaminostyrene and mixtures thereof.

Among these ethylenically unsaturated compounds having the functional group, those having the carboxyl group or the acid anhydride group are preferred.

Examples of the other ethylenically unsaturated compound copolymerizable with the ethylenically unsaturated compound having the functional group are olefins (e.g. ethylene, propylene, 1-butene, etc.), aromatic vinyl compounds (e.g. styrene, α-methylstyrene, p-methylstyrene, etc.), cyanated vinyl compounds (e.g. acrylonitrile, acrylonitrile, etc.), alkyl esters of unsaturated carboxylic acids (e.g. methyl acrylate, butyl acrylate, 2-ethylhexyl acrylate, methyl methacrylate, etc.), maleimide compounds (e.g. maleimide, N-phenylmaleimide, etc.), unsaturated amide compounds (e.g. acrylamide, methacrylamide, etc.), vinyl esters (e.g. vinyl propionate, etc.) and the compounds which constitute the rubber used in the preparation of the rubber-modified styrene base thermoplastic resin (A). They may be used independently or as a mixture thereof.

The polymer having the functional group (C) can be prepared by copolymerizing the ethylenically unsaturated compound having the functional group and the other ethylenically unsaturated compound or graft copolymerizing the ethylenically unsaturated compound having the functional group in the presence of a polymer of the other ethylenically unsaturated compound. Among the polymer (C), those comprising the aromatic vinyl compound are preferred.

The copolymer (C) may be prepared by any of conventional methods such as emulsion polymerization, suspension polymerization, bulk polymerization, solution polymerization and combinations thereof.

Specific examples of the polymer (C) are styreneacrylic acid copolymer, styrene-methacrylic acid copolymer, acrylonitrile-styrene-methacrylic acid copolymer, styrenemethyl methacrylate-methacrylic acid copolymer, copolymers corresponding to the just described copolymers in which acrylic acid or methacrylic acid is replaced with maleic anhydride, styrene-hydroxyethyl acrylate, acrylonitrile-styrene-hydroxyethyl acrylate copolymer, styrene-hydroxyethyl methacrylate copolymer, acrylonitrile-styrene-hydroxyethyl methacrylate, styrene-dimethylaminoethyl acrylate copolymer, acrylonitrile-styrene-dimethylaminoethyl acrylate, styrene-dimethylaminoethyl methacrylate, acrylo-nitrile-styrene-dimethylaminoethyl methacrylate copolymer, styrene-diethylaminoethyl methacrylate copolymer, acrylo-nitrile-styrene-dimethylaminoethyl methacrylate copolymer, styrene-2-vinylpyridine copolymer, acrylonitrile-styrene-2vinylpyridine copolymer, ethylene-acrylic acid copolymer and its metal salt, ethylene-methacrylic acid copolymer and its metal salt, ethylene-diethylaminoethyl methacrylate copolymer, ethylene-propylene-acrylic acid copolymer, ethylene-propylene-methacrylic acid copolymer, rubber-modified styrene-acrylic acid copolymer, rubber-modified styrenemethacrylic acid copolymer, rubber-modified acrylonitrile-styrene-acrylic acid copolymer, rubber-modified acrylo-nitrile-styrene-methacrylic acid copolymer, rubber-modified acrylonitrile-styrene-2-vinylpyridine copolymer, rubber-modified acrylonitrile-styrene-hydroxyethyl acrylate copolymer, rubber-modified acrylonitrile-styrene-hydroxyethyl methacrylate, rubber-modified acrylonitrile-styrenedimethylaminoethyl acrylate copolymer, rubber-modified acrylonitrile-styrene-diethylaminoethyl methacrylate copolymer, rubber-modified acrylonitrile-styrene-2-vinylpyridine copolymer and mixtures thereof.

In the thermoplastic resin composition of the present invention, the amounts of the rubber-modified styrene base thermoplastic resin (A), the copolymer (B) and the polymer (C) are 40 to 99.8 parts by weight, 0.1 to 20 parts by weight and 0.1 to 50 parts by weight, respectively, preferably 75 to 99 parts by weight, 0.5 to 10 parts by weight and 0.5 to 20 parts by weight, respectively with the total amount of the rubber-modified styrene base thermoplastic resin (A), the polymer (B) and the polymer (C) being 100 parts by weight, and the content of the rubber in the composition is from 5 to 40% by weight, preferably from 10 to 30% by weight based on the weight of the composition.

When the amount of rubber-modified styrene base thermoplastic resin (A) is smaller than 40 parts by weight, the impact strength and the flowability are not well balanced and when it is larger than 99.8 parts by weight, the delustering effect is unsatisfactory. When the amount of the copolymer having the epoxy group but comprising no olefin (B) is smaller than 0.1 parts by weight, the molded article does not have a uniformly delustered surface and the delustering effect is unsatisfactory, and when it is larger than 20 parts by weight, the flowability is considerably deteriorated. When the polymer having the functional group (C) is smaller than 0.1 parts by weight, the delustering effect is deteriorated, and when it is larger than 50 parts by weight, the flowability is considerably decreased. When the content of the rubber in the composition is less than 5% by weight, the impact strength is greatly deteriorated, and when it is larger than 40% by weight, the flowability and the stiffness are undesirably decreased.

There is no specific limitation on a method for mixing the rubber-modified styrene base thermoplastic resin (A), the copolymer having the epoxy group but comprising no olefin (B) and the polymer having the functional group (C). They may be mixed in the form of latexes, powder, beads, pellets and the like. In addition, there is no limitation on a mixing order of these three polymers. For example, all the three polymers can be mixed at once, or two of them are premixed and then mixed with the remaining one. Melt kneading can be carried out by means of a Banbury mixer, rolls, an extruder and the like.

The thermoplastic resin composition of the present invention may contain conventionally used additives such as an antioxidant, an ultraviolet light absorbing agent, an antistatic agent, a lubricant, a dye, a pigment, a plasticizer, a flame retardant, a mold release agent and the like. Further, to the thermoplastic resin composition of the present invention, other thermoplastic resin such as polyamide, polyacetal, polycarbonate, polybutylene terephthalate, polyphenylene oxide, polymethyl methacrylate and polyvinyl chloride may be added.

PREFERRED EMBODIMENTS OF THE INVENTION

The present invention will be illustrated by following Examples, in which "parts" and "%" are by weight unless otherwise indicated.

PREPARATION EXAMPLE 1

Preparation of the rubber-modified styrene base thermoplastic resin (A)

A-1

In a reactor which had been replaced with nitrogen, a polybutadiene latex (average particle size: 0.4 μm, gel content: 80%, solid content: 50%) (100 parts), potassium persulfate (0.3 parts) and pure water (100 parts) were charged and heated to 65° C. while stirring. Then, a mixed monomer solution of acrylonitrile (15 parts), styrene (35 parts) and tert.-dodecylmercaptan (0.2 part) and an aqueous solution of emulsifier (30 parts) containing disproportionated potassium resinate (2 parts) were continuously added over 4 hours each. The polymerization system was heated to 70° C. and aged for 3 hours. to complete the polymerization to obtain a latex of ABS graft copolymer.

A-2

In a reactor which had been replaced with nitrogen, potassium persulfate (0.3 part) and pure water (120 parts) were charged and heated to 65° C. while stirring. Then, a mixed monomer solution of acrylonitrile (30 parts), styrene (70 parts) and tert.-dodecylmercaptan (0.3 part) and an aqueous solution of emulsifier (30 parts) containing disproportionated potassium resinate (2 parts) were continuously added over 4 hours each. The polymerization system was heated to 70° C. and aged for 3 hours to complete the polymerization to obtain a latex of acrylonitrile-styrene copolymer.

A-3

In a reactor which had been replaced with nitrogen, pure water (150 parts), potassium persulfate (0.5 part) and sodium laurylsulfate (2 parts) were charged and heated to 70° C. while stirring. Then, a mixed monomer solution of acrylonitrile (30 parts), α-methylstyrene (70 parts) and tert.-dodecylmercaptan (0.2 part) was continuously added over 5 hours. The polymerization system was heated to 75° C. and aged for 5 hours to complete the polymerization to obtain a latex of acrylonitrile-α-methylstyrene copolymer.

A-4

In a reactor which had been replaced with nitrogen, pure water (120 parts) and potassium persulfate (0.3 part) were charged and heated to 65° C. while stirring. Then, a mixed monomer solution of acrylonitrile (25 parts), N-phenylmaleimide (25 parts), styrene (50 parts) and tert.-dodecylmercaptan (0.3 part) and an aqueous solution of emulsifier (30 parts) containing sodium laurylsulfate (2 parts) were continuously added over 4 hours each. Then, the polymerization system was heated to 70° C. and aged for 3 hours to complete the polymerization to obtain a latex of acrylo-nitrile-N-phenylmaleimide-styrene copolymer.

To the ABS graft copolymer latex (100 parts), Sumilizer (trade mark) BBM (1 part) as an antioxidant and tris-nonylphenyl phosphite (2 parts) were added. Then, the latex was salted out with calcium chloride, and the polymer was dehydrated and dried to obtain powdery ABS graft copolymer. Each of the styrene base copolymer latexes A-2, A-3 and A-4 was salted out with calcium chloride, and the polymer was dehydrated and dried to obtain powdery polymer.

PREPARATION EXAMPLE 2

Preparation of the copolymer having the epoxy group but comprising no olefin (B)

B-1

In a reactor which had been replaced with nitrogen, potassium persulfate (0.3 part) and pure water (120 parts) were charged and heated to 65° C. while stirring. Then, a mixed monomer solution of acrylonitrile (30 parts), styrene (60 parts), glycidyl methacrylate (10 parts) and tert.-dodecylmercaptan (0.3 part) and an aqueous solution of emulsifier (30 parts) containing sodium laurylsulfate (2 parts) were continuously added over 4 hours each. Then, the polymerization system was heated to 70° C. and aged for 3 hours to complete the polymerization to obtain a copolymer.

B-2

In the same manner as in the preparation method B-1 but using 25 parts of acrylonitrile, 70 parts of styrene and 5 parts of glycidyl methacrylate, polymerization was carried out to obtain a copolymer.

B-3

In the same manner as in the preparation method B-1 but using 30 parts of acrylonitrile, 69 parts of styrene and 1 parts of glycidyl methacrylate, polymerization was carried out to obtain a copolymer.

The copolymers B-1, B-2 and B-3 had intrinsic viscosities (at 30° C. in dimethylformamide) of 0.92, 0.71 and 0.39, respectively.

Each latex of the copolymers B-1, B-2 and B-3 was salted out with calcium chloride, and the polymer was dehydrated and dried to obtain powdery copolymer.

PREPARATION EXAMPLE 3

Preparation of the polymer having the functional group (C)

C-1

In the same manner as in the preparation method B-1 but using 3 parts of methacrylic acid in place of glycidyl methacrylate and 67 parts of styrene, polymerization was carried out to obtain a copolymer.

C-2

In the same manner as in the preparation method B-1 but using methacrylic acid in place of glycidyl methacrylate, polymerization was carried out to obtain a copolymer.

C-3

In the same manner as in the preparation method C-2 but using 20 parts of methacrylic acid and 20 parts of acrylonitrile, polymerization was carried out to obtain a copolymer.

C-4

In the same manner as in the preparation method C-2 but using hydroxyethyl acrylate in place of methacrylic acid, polymerization was carried out to obtain a copolymer. C-5

In the same manner as in the preparation method C-2 but using 2-vinylpyridine in place of methacrylic acid, polymerization was carried out to obtain a copolymer.

C-6

In a reactor which had been replaced with nitrogen, a polybutadiene latex (average particle size: 0.45 μm, gel content: 80%, solid content: 50%) (100 parts), potassium persulfate (0.3 parts), sodium dodecylbenzenesulfonate (0.5 parts) and pure water (100 parts) were charged and heated to 65° C. while stirring. Then, a mixed monomer solution of acrylonitrile (10 parts), styrene (20 parts), methacrylic acid (20 parts) and tert.-dodecylmercaptan (0.3 part) and an aqueous solution of emulsifier (30 parts) containing sodium dodecylbenzenesulfonate (1 parts) were continuously added over 4 hours each. The polymerization system was heated to 70° C. and aged for 3 hours to complete the polymerization to obtain a copolymer.

The copolymers C-1 through C-5 had intrinsic viscosities (at 30° C. in dimethylformamide) of 0.39, 0.51, 0.81, 0.83 and 0.65, respectively.

Each latex of the copolymers C-1 through C-6 was salted out with calcium chloride, and the polymer was dehydrated and dried to obtain powdery copolymer. In case of the copolymer C-6, it was salted out after the addition of an antioxidant.

PREPARATION EXAMPLE 4

Preparation of an olefin copolymer having the epoxy group (D)

By using an autoclave type apparatus for producing polyethylene, ethylene (90 parts) and glycidyl methacrylate (10 parts) were copolymerized under conditions employed for the preparation of high pressure polyethylene.

PREPARATION EXAMPLE 5

Rubber-modified styrene base thermoplastic resin (A)

A-5

By the conventional suspension polymerization method, styrene (45 parts) and acrylonitrile (15 parts) were graft polymerized onto ethylene-propylene-nonconjugated diene rubber containing ethylidene norbornene as a nonconjugated diene (propylene content: 50%, iodide value: 15, Mooney viscosity: 75) followed by dehydration and drying to obtain a graft copolymer.

The obtained graft copolymer was mixed with the copolymer A-2 to obtain a rubber-modified styrene base thermoplastic resin, namely AES resin (rubber content: about 16%).

A-6

In the same manner as in the preparation method A-1 but using a latex of polybutyl acrylate comprising acrylonitrile (5 parts) and butyl acrylate (95 parts) (average particle size: 0.31 μm, solid content: 50%) in place of the polybutadiene latex, polymerization was carried out. Then, after the addition of an antioxidant, the polymerization mixture was salted out, dehydrated and dried to obtain a graft copolymer.

The obtained graft copolymer was mixed with the acrylonitrile-styrene copolymer A-2 to obtain a rubber-modified styrene base thermoplastic resin, namely AAS resin (rubber content: about 15%).

A-7

By a known bulk polymerization procedure, a rubber-reinforced polystyrene containing 7% of the rubber was prepared.

EXAMPLES 1–12 AND COMPARATIVE EXAMPLES 1–10

The rubber-modified styrene base thermoplastic resin (A), the copolymer having the epoxy group but comprising no olefin (B), the polymer having the functional group (C) and the olefinic copolymer having the epoxy group (D), all of which were prepared in above Preparation Examples were mixed in amounts shown in Table 1 and melt kneaded by a 40 mm single screw extruder. Properties of the obtained resin composition were measured as follows, and the results are shown in Table 1:

Impact strength (Notched Izod impact strength)

Impact strength of the resin composition is measured according to ASTM D-256.

Flowability

Flowability of the resin composition is measured by the use of a KOKA-type flow tester under following conditions:
Temperature: 230° C.
Load: 60 kg/cm$^2$ Surface gloss and uneven gloss By using a 3.5 ounce injection molding machine, a test plate of 60 mm in length, 60 mm in width and 3 mm in thickness is prepared and its gloss in a center area is measured by using a angle-variable digital glossmeter (UGVD manufactured by Suga Testing Machines Co., Ltd.) at an angle of incidence of 60°.

The presence of uneven gloss is evaluated by naked eyes.

TABLE 1

| | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Composition (parts) | | | | | | | | | | | | |
| Rubber-modified thermoplastic resin A | | | | | | | | | | | | |
| A-1 | 30 | 30 | 30 | 30 | 30 | 30 | 30 | 30 | 60 | 20 | 30 | 30 |
| A-2 | | | | | | | | | 30 | 70 | | |
| A-3 | 55 | 55 | 55 | 60 | 59 | 55 | 55 | 66 | | | 68 | |
| A-4 | | | | | | | | | | | | 47 |
| Copolymer B | | | | | | | | | | | | |
| B-1 | 5 | | | | | | | 3 | | | 1 | |
| B-2 | | 5 | | | | 5 | 5 | | 3 | 3 | | 3 |
| B-3 | | | 5 | 7 | 10 | | | | | | | |
| Polymer C | | | | | | | | | | | | |
| C-1 | 10 | 10 | 10 | | | | | | 7 | 7 | | 20 |
| C-2 | | | | 3 | | | | | | | | |

TABLE 1-continued

| | | | | | | | | | | | |
|---|---|---|---|---|---|---|---|---|---|---|---|
| C-3 | | | | | 1 | | | | | 1 | |
| C-4 | | | | | | 10 | | | | | |
| C-5 | | | | | | | 10 | | | | |
| C-6 | | | | | | | | 1 | | | |
| Rubber content in the composition (%) | 15 | 15 | 15 | 15 | 15 | 15 | 15 | 15.5 | 30 | 10 | 15 | 15 |
| Properties | | | | | | | | | | | | |
| Notched Izod impact strength (kg · cm/cm²) | 14 | 14 | 15 | 15 | 13 | 14 | 13 | 15 | 31 | 11 | 15 | 12 |
| Flowability (cc/min.) | 0.25 | 0.27 | 0.29 | 0.25 | 0.22 | 0.31 | 0.29 | 0.22 | 0.61 | 1.2 | 0.30 | 0.15 |
| Gloss (%) | 13 | 14 | 17 | 15 | 17 | 16 | 16 | 19 | 14 | 13 | 25 | 19 |
| Uneven gloss | No | No | No | No | No | No | No | No | No | No | No | No |

| | Comp. Example No. | | | | | | | | | |
|---|---|---|---|---|---|---|---|---|---|---|
| | 1 | 2 | 3 | 4 | 5 | 6 | 7 | 8 | 9 | 10 |
| Composition (parts) | | | | | | | | | | |
| Rubber-modified thermoplastic resin A | | | | | | | | | | |
| A-1 | 30 | 30 | 30 | 30 | 30 | 5 | 90 | 30 | 30 | 30 |
| A-3 | 70 | 59.95 | 30 | 64.95 | 5 | 80 | | 65 | 60 | 60 |
| Copolymer B | | | | | | | | | | |
| B-2 | | 0.05 | 30 | 5 | 5 | 5 | 5 | 5 | | |
| Polymer C | | | | | | | | | | |
| C-1 | | 10 | 10 | | 60 | 10 | 5 | | | |
| C-2 | | | | | | | | | 10 | |
| C-3 | | | | 0.05 | | | | | | |
| Polymer D | | | | | | | | | | 10 |
| Rubber content in the composition (%) | 15 | 15 | 15 | 15 | 15 | 2.5 | 45 | 15 | 15 | 15 |
| Properties | | | | | | | | | | |
| Notched Izod impact strength (kg · cm/cm²) | 15 | 15 | 7 | 10 | 4 | 2 | 39 | 13 | 12 | 6 |
| Flowability (cc/min.) | 0.3 | 0.29 | 0.05 | 0.28 | 0.04 | 0.42 | 0.05 | 0.25 | 0.1 | 0.15 |
| Gloss (%) | 91 | 58 | 7 | 45 | 6 | 13 | 17 | 51 | 45 | 17 |
| Uneven gloss | No | Yes | No | Yes | No | No | No | Yes | Yes | No |

EXAMPLES 13-15 AND COMPARATIVE EXAMPLES 11-13

In the same manner as in Example 1 but using the rubber-modified styrene base thermoplastic resins prepared in Preparation Example 5 (A-5, A-6 and A-7), the copolymer B-2 and the copolymer C-1 in amounts shown in Table 2, a resin composition was prepared and its properties were measured. In these Examples, flowability was measured at 210° C. under a load of 30 kg/cm² The results are shown in Table 2.

TABLE 2

| Example No. | 13 | C.11 | 14 | C.12 | 15 | C.13 |
|---|---|---|---|---|---|---|
| Rubber-modified thermoplastic resin (A) (parts) | | | | | | |
| A-5 (AES) | 90 | 100 | | | | |
| A-6 (AAS) | | | 90 | 100 | | |
| A-7 (HIPS) | | | | | 90 | 100 |
| Copolymer B-2 (parts) | 3 | 0 | 5 | 0 | 7 | 0 |
| Copolymer C-1 (parts) | 7 | 0 | 5 | 0 | 3 | 0 |
| Rubber content in the composition (%) | 14.4 | 16 | 13.5 | 15 | 6.3 | 7 |
| Notched Izod impact strength (kg · cm/cm²) | 23 | 25 | 15 | 17 | 7 | 8 |
| Flowability (cc/min) | 0.15 | 0.18 | 0.08 | 0.10 | 0.55 | 0.62 |
| Gloss (%) | 17 | 85 | 18 | 87 | 11 | 65 |
| Uneven gloss | No | No | No | No | No | No |

EXAMPLE 16 AND COMPARATIVE EXAMPLE 14

In the same manner as in Example 1 but using the rubber-modified styrene base thermoplastic resin A-1, the copolymer B-2, the copolymer C-1 and aromatic polycarbonate in amounts shown in Table 3, a resin composition was prepared and its properties were measured. The results are shown in Table 3.

TABLE 3

| Example No. | 16 | Comparative 14 |
|---|---|---|
| Rubber-modified thermoplastic resin A | | |
| A-1 (ABS) | 45 | 50 |
| Copolymer B-2 (parts) | 3 | 0 |
| Copolymer C-1 (parts) | 7 | 0 |
| Polycarbonate (parts) | 45 | 50 |
| Notched Izod impact strength (kg · cm/cm²) | 50 | 55 |
| Flowability (cc/min.) | 0.55 | 0.39 |
| Gloss (%) | 13 | 91 |
| Uneven gloss | No | No |

What is claimed is:

1. A thermoplastic resin composition comprising:
(A) 40 to 99.8 parts by weight of a rubber-modified styrene base thermoplastic resin which is obtainable by polymerizing at least one aromatic vinyl compound, or at least one aromatic vinyl compound and at least one ethylenically unsaturated compound polymerizable therewith, in the presence of a rubber to form a graft polymer or which is a mixture of said graft polymer and a copolymer comprising at least one aromatic vinyl compound and at least one ethylenically unsaturated compound copolymerizable therewith,
(B) 0.1 to 20 parts by weight of a copolymer having an epoxy group and comprising at least one aromatic vinyl compound but comprising no olefin, and
(C) 0.1 to 50 parts by weight of a polymer comprising at least one aromatic vinyl compound and ethylenically unsaturated compound having at least one functional group selected from the group consisting of a carboxyl group, a hydroxyl group and a nitrogen-containing base group or which is selected from the group consisting of itaconic anhydride and citraconic anhydride and mixtures thereof;

with the total amount of the rubber-modified styrene base thermoplastic resin (A), the copolymer (B) and the polymer (C) being 100 parts by weight and the content of the rubber in the composition being from 5 to 40% by weight based on the weight of the composition.

2. The thermoplastic resin composition according to claim 1, wherein the polymer (C) has the carboxyl group or the itaconic anhydride or citraconic anhydride group as the functional group.

3. The thermoplastic resin composition of claim 1 wherein the ethylenically unsaturated compound of the polymer of (C) has at least one functional group selected from the group consisting of a carboxyl group, a hydroxyl group and a nitrogen containing base group.

4. The thermoplastic resin composition according to claim 3, comprising 75 to 99 parts by weight of rubber-modified styrene base thermoplastic resin (A), 0.5 to 10 parts by weight of copolymer (B), and 0.5 to 20 parts by weight of component (C), the total amount of (A), (B) and (C) being 100 parts by weight, and the content of the rubber in the composition being from 10 to 30% by weight based on the weight of the composition.

5. The thermoplastic resin composition of claim 4 wherein said at least one functional group is a hydroxyl group.

6. The thermoplastic resin composition of claim 5 wherein the ethylenically unsaturated compound of the polymer (C) is hydroxyethyl acrylate.

7. The thermoplastic resin composition of claim 6 wherein the rubber-modified styrene base thermoplastic resin (A) is mixture of butadiene base rubber-modified acrylonitrile-styrene copolymer and acrylonitrile-styrene copolymer and the copolymer (B) is acrylonitrile-styrene-glycidyl methacrylate copolymer.

8. The thermoplastic resin composition of claim 4 wherein said at least one functional group is a nitrogen-containing base group.

9. The thermoplastic resin composition of claim 8 wherein the ethylenically unsaturated compound of the polymer (C) is 2-vinylpyridine.

10. The thermoplastic resin composition of claim 9 wherein the rubber modified styrene base thermoplastic resin (A) is mixture of butadiene base rubber-modified acrylonitrile-styrene copolymer and acrylonitrile-styrene copolymer and the copolymer (B) is acrylonitrile-styrene-glycidyl methacrylate copolymer.

11. The thermoplastic resin composition of claim 4 wherein said at least one functional group is a carboxyl group.

12. The thermoplastic resin composition of claim 11 wherein the ethylenically unsaturated compound of the polymer (C) is selected from the group consisting of acrylic acid, methacrylic acid, fumaric acid, itaconic acid and mixtures thereof.

13. The thermoplastic resin composition of claim 12 wherein the ethylenically unsaturated compound of the polymer (C) is methacrylic acid.

14. The thermoplastic resin composition of claim 13 wherein the rubber-modified styrene base thermoplastic resin (A) is butadiene base rubber-modified acrylonitrile-styrene copolymer or mixture thereof with copolymer selected from the group consisting of acrylonitrile-styrene copolymer, acrylonitrile-α-methylstyrene copolymer, and acrylonitrile-N-phenylmaleimide-styrene copolymer and mixtures thereof and the copolymer (B) is acrylonitrile-styrene-glycidyl methacrylate copolymer.

15. The thermoplastic resin composition of claim 13 wherein the rubber-modified styrene base thermoplastic resin (A) is mixture of styrene and acrylonitrile graft polymerized onto ethylene-propylene-non-conjugated diene rubber and acrylonitrile-styrene copolymer and the copolymer (B) is acrylonitrile-styreneglycidyl methacrylate copolymer.

16. The thermoplastic resin composition of claim 13 wherein the rubber-modified styrene base thermoplastic resin (A) is alkyl acrylate base rubber-modified acrylonitrile-styrene copolymer and the copolymer (B) is acrylonitrile-styrene-glycidyl methacrylate copolymer.

17. The thermoplastic resin composition of claim 13 wherein the rubber-modified styrene base thermoplastic resin (A) is butadiene base rubber-modified styrene polymer and the copolymer (B) is acrylonitrile-styrene-glycidyl methacrylate copolymer.

18. The thermoplastic resin composition of claim 12 wherein the rubber-modified styrene base thermoplastic resin (A) is mixture of butadiene base rubber-modified acrylonitrile-styrene copolymer and acrylonitrile-α-methylstyrene copolymer, the copolymer (B) is acrylonitrile-styrene-glycidyl methacrylate copolymer and the copolymer (C) is polybutadiene base rubber-modified acrylonitrile-styrene-methacrylic acid copolymer.

* * * * *